United States Patent [19]

Keogh

[11] 4,407,992
[45] * Oct. 4, 1983

[54] FLAME RETARDANT COMPOSITIONS BASED ON ALKYLENE-ALKYL ACRYLATE COPOLYMERS

[75] Inventor: Michael J. Keogh, Bridgewater, N.J.

[73] Assignee: Union Carbide Corporation, Danbury, Conn.

[ * ] Notice: The portion of the term of this patent subsequent to Jan. 6, 1998 has been disclaimed.

[21] Appl. No.: 411,561

[22] Filed: Aug. 30, 1982

Related U.S. Application Data

[63] Continuation-in-part of Ser. No. 127,509, Mar. 5, 1980, abandoned, and Ser. No. 192,356, Sep. 30, 1980, abandoned, which is a continuation-in-part of Ser. No. 944,336, Sep. 21, 1978, Pat. No. 4,243,579.

[51] Int. Cl.$^3$ .......................... C08K 5/54; C08K 3/22; C08K 3/26; C08K 3/30

[52] U.S. Cl. ........................ 524/94; 524/411; 524/412; 524/423; 524/425; 524/433; 524/436; 174/110 SR

[58] Field of Search ............... 524/411, 412, 423, 425, 524/433, 436, 94; 174/110 SR

[56] References Cited

U.S. PATENT DOCUMENTS

| | | | |
|---|---|---|---|
| 3,030,327 | 4/1962 | Hosch | 260/30.6 R |
| 3,061,468 | 10/1962 | Tryon | 428/921 |
| 3,325,833 | 6/1967 | Raley | 260/28.5 |
| 3,350,372 | 10/1967 | Anspon et al. | 260/86.7 |
| 3,361,705 | 1/1968 | Kay et al. | 260/37 |
| 3,382,209 | 5/1968 | Deichert | 260/45.75 |
| 3,772,232 | 11/1973 | Hayes | 260/28.5 AV |
| 3,793,288 | 2/1974 | Elder | 260/42.15 |
| 3,816,367 | 6/1974 | Larkin et al. | 524/410 |
| 3,832,326 | 8/1974 | North et al. | 260/42.15 |
| 3,862,070 | 1/1975 | Fukushima et al. | 524/140 |
| 3,865,782 | 2/1975 | Anderson | 260/45.75 R |
| 3,907,727 | 9/1975 | Lipp | 260/17 R |
| 3,953,565 | 4/1976 | Mizutani et al. | 264/210 R |
| 4,012,343 | 3/1977 | Raley | 260/28.5 AV |
| 4,038,237 | 7/1977 | Snyder | 260/45.7 ST |
| 4,067,847 | 1/1978 | Yui et al. | 260/45.7 R |
| 4,100,075 | 7/1978 | Ashman et al. | 260/DIG. 24 |
| 4,119,601 | 10/1978 | Bonnaud et al. | 260/28.5 D |
| 4,126,593 | 11/1978 | Takahashi | 260/DIG. 24 |
| 4,173,561 | 11/1979 | Tabana et al. | 524/91 |
| 4,189,619 | 2/1980 | Pedlow | 260/DIG. 24 |
| 4,243,579 | 1/1981 | Keogh | 524/423 |
| 4,353,997 | 10/1982 | Keogh | 524/411 |

*Primary Examiner*—Veronica P. Hoke
*Attorney, Agent, or Firm*—James C. Arvantes; Robert C. Brown

[57] ABSTRACT

The disclosure of this application is directed to flame retardant compositions comprising an alkylene-alkyl acrylate copolymer, a halogenated flame retardant additive, an oxide, hydroxide, carbonate or sulfate of calcium or magnesium and antimony oxide as a second flame retardant additive. The compositions, as described, can be extruded about electrical conductors to provide insulation thereon and also extruded as jacketing about telephone wires and cables.

27 Claims, No Drawings

FLAME RETARDANT COMPOSITIONS BASED ON ALKYLENE-ALKYL ACRYLATE COPOLYMERS

This application is a continuation-in-part of copending application Ser. No. 192,356 filed Sept. 30, 1980, now abandoned which in turn is a continuation-in-part of application Ser. No. 944,336 filed Sept. 21, 1978, now U.S. Pat. No. 4,243,579, granted Jan. 6, 1981 and also a continuation-in-part of copending application Ser. No. 127,509 filed Mar. 5, 1980, now abandoned.

SUMMARY OF THE INVENTION

This invention relates to flame retardant compositions characterized by an improved balance of properties with respect to acid gas and smoke evolution, on burning, which contain a copolymer of an alkylene-alkyl acrylate, a halogenated flame retardant additive, antimony oxide and an oxide, carbonate, hydroxide or sulfate of magnesium or calcium, and are particularly useful as jacketing material about industrial control cables and telephone wires and cables and as insulation about electrical conductors.

BACKGROUND OF THE INVENTION

Compositions based on olefin polymers, such as copolymers of an alkylene-alkyl acrylate, by reason of their advantageous physical and electrical properties, have been suggested for use in various commercial applications. For example, alkylene-alkyl acrylate copolymers are corrosion resistant, tough and abrasion resistant. Consequently, alkylene-alkyl acrylate copolymers have been suggested for use in compositions to be used as jacketing material about industrial control cables and telephone wires and cables and as insulation about electrical conductors.

Although alkylene-alkyl acrylate copolymers have properties which make them desirable for use in compositions to be used as jacketing material and as insulation, as described, alkylene-alkyl acrylate copolymers suffer the disadvantage of being flammable. In order to render these copolymers flame retardant and also, in order to reduce gas evolution, on burning, a halogenated flame retardant additive and an alkaline earth metal salt or base have been added thereto, as described in my U.S. Pat. No. 4,243,579. These composition are commercially attractive systems which are flame retardant, and upon burning, do not produce dense smoke, do not evolve high levels of acidic and corrosive gases and, in addition, exhibit reduced after-glow.

Currently, in light of more stringent industry standards and more stringent government regulations, there is an immediate need for compositions which are characterized by an improved balance of properties.

DESCRIPTION OF THE INVENTION

The present invention provides compositions which are characterized by an improved balance of properties, with respect to flame retardancy, acid gas evolution and smoke evolution.

Compositions of the present invention, useful for the applications described, comprise a normally solid alkylene-alkyl acrylate copolymer, from about one to about 30 percent by weight and preferably from about 5 to about 20 percent by weight of a halogenated flame retardant additive, from about 0.5 to about 30 percent by weight, preferably from about 2.5 to about 12 percent by weight of an oxide, carbonate, hydroxide or sulfate of magnesium or calcium and from about 0.5 to about 15 percent by weight, preferably from about one to about 10 percent by weight of antimony oxide.

In those instances wherein the compositions are to be used in molding applications to form such articles as flame retardant waste paper baskets, household fixtures and the like, the amount of alkaline earth metal salt or base in the compositions can be about 0.5 to about 50 percent by weight.

A particularly desirable composition for use as insulation about electrical conductors comprises a normally solid alkylene-alkyl acrylate copolymer, from about one to about 30 percent by weight of a halogenated flame retardant additive, from about 0.5 to 20 percent by weight of an alkaline earth metal salt or base, as described, and from about one to about 5 percent by weight of antimony oxide.

A particularly desirable composition for use as jacketing about industrial control cables and telephone wires and cables comprises a normally solid alkylene-alkyl acrylate copolymer, from about one to about 30 percent by weight of a halogenated flame retardant additive, more than 20 and up to about 30 percent by weight of an alkaline earth metal salt or base, as described, and from about one to about 10 percent by weight of antimony oxide.

Percent by weight, unless otherwise specified, is based on the total weight of the composition, 100 percent by weight.

Also, mixtures of materials can be used, if so desired.

The alkylene-alkyl acrylate copolymers of the present invention are known products produced by reacting an alkene with an alkyl acrylate or mixtures of reactants and usually contain about 2 to about 50 percent by weight combined alkyl acrylate.

Suitable alkenes are ethylene, propylene, butene-1, isobutylene, pentene-1, 2-methylbutene-1, 3-methylbutene-1, hexene, heptene-1, octene-1 and the like.

The alkylene moiety of the alkylene-alkyl acrylate copolymers contain from 2 to 18 carbon atoms inclusive, preferably 2 to 3 carbon atoms inclusive.

Suitable alkyl acrylate monomers which are copolymerized with the alkenes fall within the scope of the following formula:

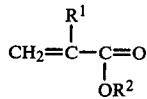

wherein $R^1$ is hydrogen or methyl and $R^2$ is alkyl having one to 8 carbon atoms inclusive. Illustrative compounds encompassed by this formula are: methyl acrylate, ethyl acrylate, methyl methacrylate, n-butyl acrylate, t-butyl acrylate, n-butyl methacrylate, 2-ethylhexyl acrylate and the like.

Alkylene-alkyl acrylate copolymers generally have a density (ASTMD 1505) with a conditioning as in ASTMD 147-72 of about 0.92 to about 0.94 and a melt index (ASTMD-1237 of 44 psi tested pressure) of about 0.5 to about 500 decigrams per minute.

For purposes of the present invention, the preferred copolymer is ethylene-ethyl acrylate, generally having about three to about 40 percent by weight combined ethyl acrylate, preferably having about 5 to about 20 percent by weight combined ethyl acrylate. Combined alkyl acrylate is conveniently determined by infrared analysis.

Halogenated flame retardant additives, useful for purposes of the present invention, are well known to those skilled in the art. These flame retardant additives are halogenated (brominated or chlorinated) organic compounds. The preferred halogenated organic compounds include chlorinated polyethylene, polyvinyl chloride, polyvinylidene chloride, polyvinyl chloride copolymers, halogenated paraffin waxes, chlorinated alicyclic hydrocarbons, and brominated aromatic compounds. The most preferred include decabromodiphenyl oxide and compounds of the following formula:

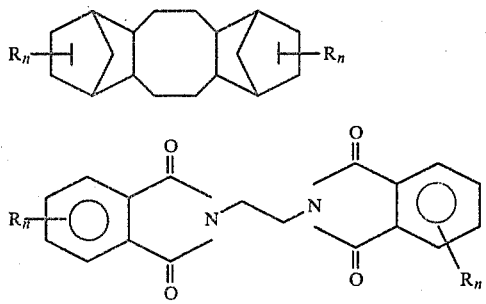

wherein R is independently chlorine or bromine and n is an integer from 1 to 6 such as ethylene(bis-tetrabromophthalimide).

The calcium or magnesium oxides, carbonates, hydroxides, or sulfates of the present invention are commercially available in different forms and grades.

The calcium or magnesium oxides, carbonates, hydroxides, or sulfates may be optionally coated with any compatible hydrophobic material. The preferred coating materials are metal salts of fatty acids, organo silanes and organo titanates.

Exemplary of the metal component of the salts of the fatty acids fall in Group Ia, IIa or IIb of the Periodic Table (Handbook of Chemistry and Physics-50th Edition). Acids used to form the metal salts are saturated or unsaturated monobasic or dibasic, branched or straight chain fatty acids of 8–20 carbon atoms. Such acids that may be included within the practice of this invention, but are not limited thereto, are palmitic, stearic, lauric, oleic, sebacic, ricinoleic, palmitoleic and the like. The preferred acid is stearic acid while the preferred metal salts are calcium stearate and zinc stearate.

The organo silanes are preferably alkoxy silanes such as alkyl alkoxy silane, alkenyl alkoxy silane, alkynyl alkoxy silane, alkyl aryl alkoxy silane, alkenyl aryl alkoxy silane and alkynyl aryl alkoxy silane. Suitable alkoxy silanes include, for example, methyltriethoxy silane, methyl-tris-(2-methoxyethoxy)silane, dimethyldiethoxy silane, allyltrimethoxy silane and the like. Also suitable are the vinyl silanes such as vinyl-tris-(2-methoxyethoxy)silane, vinyl trimethoxy silane, vinyl triethoxy silane and the like. If desired, the organo silane, per se, can be included in the composition as an additive.

Illustrative of suitable organo titanates fall within the scope of the following formula:

$$Ti(OR^3)_4$$

wherein $R^3$ is a hydrocarbon radical. Exemplary of organo titanates are tetrabutyl titanate, tetraisopropyl titanate and the like.

The alkaline earth metal compounds can be coated by admixing about 0.05 to about 5 parts by weight of hydrophobic material per 100 parts by weight of alkaline earth metal salt or base in a two-roll mill, Henschel mixer, Waring blender and the like.

Any of the antimony oxides, antimony trioxide, antimony tetra-oxide and antimony penta-oxide are suitable for purposes of the present invention. Antimony trioxide is preferred. Also, antimony oxide in the nature of a complexed salt such as sold commercially by National Lead Co. under the trade name ONCOR can be used, if desired. These complexed salts are exemplified by antimony oxide-zinc silicate salts.

The compositions of the present invention can contain other additives, as is well known in the art, depending upon the ultimate use of the compositions.

For example, the compositions can contain peroxides to cure the compositions to crosslinked products, generally on the order of about 0.05 to 4.0 percent by weight; antioxidants; conductive carbon blacks as well as other additives commonly used in moldable compositions, curable compositions, compositions to be extruded into film material, compositions to be used as coatings, adhesives and the like.

When the compositions of the present invention are to be used in wire and cable or molding applications, it is advantageous that the compositions contain a filler. A preferred filler is talc, especially talc coated with a metal salt of a fatty acid, previously described.

The compositions of the present invention are conveniently prepared by blending or compounding the components thereof in a suitable apparatus. The alkylene-alkyl acrylate copolymer and the other desired components may be blended together by any of the techniques used in the art to blend and compound thermoplastics to homogeneous masses. Prior to or during the blending of the components together, the calcium or magnesium oxide, carbonate, hydroxide or sulfate may be coated by known techniques. As regards blending, the components may be fluxed on a variety of apparatus including multi-roll mills, screw mills, continuous mixers, extruders and Banbury mixers.

When all of the solid components of the compositions are available in the form of a powder, or as small particles, the compositions are most conveniently prepared by first making a blend of the components, for instance, in a Banbury mixer or a continuous extruder, and then masticating this blend on a heated mill, for instance a two-roll mill, and the milling continued until an intimate mixture of the components is obtained.

In those instances wherein the copolymer is not available in powder form, the compositions may be prepared by introducing the copolymer to a two-roll mill, masticating it until it forms a band around roll, after which a blend of the remaining components is added and the milling continued until an intimate mixture is obtained. The rolls are preferably maintained at a temperature which is within the range of 80° C. to 135° C. and which is below the decomposition temperatures of the peroxide compound(s) if such are used. The composition, in the form of a sheet, is removed from the mill and then brought into a form, typically dice-like pieces, suitable for subsequent processing.

The compositions may then be extruded onto a wire or cable, or other substrate. If the compositions of the present invention, are chemically curable, they are extruded onto the wire or cable, or other substrate and vulcanized at elevated temperatures of about >180° C.

and preferably at >200°-230° C. using conventional vulcanizing procedures.

The following examples are illustrative of the present invention and are not intended to limit the scope thereof in any manner.

Compositions were prepared by admixing components, identified in Table 1, in a 40 gram Brabender mixer which had been preheated to a temperature of 120° C., for about five minutes. After the five minute period, the contents of the Brabender were discharged, hot, flattened in a press and allowed to cool.

Samples of each composition were used to prepare test plaques, having dimensions of 3 inches by 8 inches by 0.125 inch, in a press under the following conditions: Pressure—5000 psi Temperature—180° C. Time cycle—15 minutes.

Plaques were then subjected to the Limiting Oxygen Index test ASTMD-2863-70, which is an indication of flame retardant properties.

Formulations of Example 1 and Controls 1-3 were in parts by weight.

The data of Table 1 clearly indicates that, on a direct comparison, between a composition based on an alkylene-alkyl acrylate copolymer, i.e. ethylene-ethyl acrylate (Example 1) and a composition based on an ethylene-vinyl acetate copolymer (Control 1) the composition of Example 1 has superior flame retardant properties, 26.2 as compared to 23.3 for the composition of Control 1.

TABLE 1

| Formulation: | Example 1 | Control 1 | Control 2 | Control 3 |
|---|---|---|---|---|
| Copolymer of ethylene-ethyl acrylate containing 15 percent by weight combined ethyl acrylate - melt index 1.6 | 55 | — | — | 55 |
| Copolymer of ethylene-vinyl acetate containing 10 percent by weight combined vinyl acetate - melt index 2.0 | — | 55 | 55 | — |
| Talc coated with zinc stearate | 21.5 | 21.5 | 24 | 24 |
| Antimony trioxide | 2.5 | 2.5 | 2.5 | 2.5 |
| Calcium carbonate | 2.5 | 2.5 | — | — |
| Ethylene(Bis-tetrabromophthalimide) (flame retardant additive) | 16.0 | 16.0 | 16.0 | 16.0 |
| 1,2-Dihydro-2,3,4-trimethyl quinoline (antioxidant) | 0.5 | 0.5 | 0.5 | 0.5 |
| Vinyl-tris(2-methoxyethoxy) silane | 0.2 | 0.2 | 0.2 | 0.2 |
| Di-α-cumyl peroxide | 1.8 | 1.8 | 1.8 | 1.8 |
| Limiting Oxygen Index | 26.2 | 23.3 | 24.2 | 25.3 |

A masterbatch composition was prepared and samples thereof, with and without additional additives, were tested for flame retardancy and evolution of smoke.

The masterbatch composition had the following formulation:

| | PERCENT BY WEIGHT |
|---|---|
| Copolymer of ethylene-ethyl acrylate containing 15 percent by weight combined ethyl acrylate and having a melt index of 1.6 | 58.9 |
| Talc coated with zinc stearate | 23.1 |
| Ethylene(Bis-tetrabromophthalimide) | 17.2 |
| 1,2-Dihydro-2,3,4-trimethyl quinoline | 0.6 |
| Vinyl-tris(2-methoxyethoxy) silane | 0.2 |

To this masterbatch there was also added 1.5 percent by weight di-α-cumyl peroxide.

Samples of the masterbatch composition, containing the peroxide and subsequently identified in Table II as MB were admixed with various additives and the resultant compositions were formed into plaques, all as previously described and tested for flame retardancy and evolution of smoke, upon burning.

TABLE II

| | Example 2 | Control 4 | Control 5 | Control 6 |
|---|---|---|---|---|
| M.B. | 88 | 100 | 98.5 | 90 |
| Antimony trioxide | 2 | 0 | 1.5 | 0 |
| Calcium carbonate | 10 | 0 | 0 | 10 |
| Limiting Oxygen Index | 26.5 | 23.8 | 24.6 | 25.3 |
| Percent by weight smoke evolved, on burning, based on weight of sample burned | 7.97 | 6.76 | 10.53 | 4.69 |

Compositions, the formulations of which are set forth in Table 3, were prepared, formed into plaques and tested for flame retardancy as described previously with respect to compositions of Table 1.

Compositions of Table 3 were also tested for percent ash, percent halogen retained in the ash and percent smoke evolved.

Percent ash value, which is a measure of retained ash, is important for several reasons. Retained ash serves as heat and electrical insulation, aiding in maintaining the integrity of the product, on burning in a fire incident. Also, retained ash aids in reducing dripping from the burning product.

Percent by weight ash-determined by the procedure described in Plastics Technology, March 1976, pages 46-49.

A higher percent halogen content in the ash means that less halogen has been released to the atmosphere. A composition which releases less halogen, measured as halogen acid, is less toxic to humans and less corrosive to equipment.

Percent by weight halogen content of ash-determined by the procedure described in Quantitative Organic Microanalysis, A. Steyermark, Academic Press, New York and London, 1961, pages 316-339.

Percent by weight smoke evolved-determined by the procedure described in Journal of Fire and Flammability, Volumn 9, October 1978, pages 459-466.

Amounts noted in Table 3 are in parts by weight. Abbreviation "C" stands for Control.

TABLE 3

| | C-7 | C-8 | Ex-3 | C-9 | Ex-4 | C-10 | Ex-5 | C-11 | Ex-6 | C-12 | Ex-7 | C-13 | Ex-8 | C-14 | Ex-9 | C-15 |
|---|---|---|---|---|---|---|---|---|---|---|---|---|---|---|---|---|
| Ethylene-ethyl acrylate copolymer of Example 10 | 50 | — | 50 | — | 50 | — | 50 | — | 40 | — | 30.2 | — | 50.6 | — | 50 | — |
| Ethylene-vinyl acetate copolymer of Control 1 | — | 50 | — | 50 | — | 50 | — | 50 | — | 40 | — | 30.2 | — | 50.6 | — | 50 |
| Talc coated with zinc stearate | 26.8 | 26.8 | 21.8 | 21.8 | 16.8 | 16.8 | — | — | — | — | — | — | 16.8 | 16.8 | — | — |

TABLE 3-continued

| | C-7 | C-8 | Ex-3 | C-9 | Ex-4 | C-10 | Ex-5 | C-11 | Ex-6 | C-12 | Ex-7 | C-13 | Ex-8 | C-14 | Ex-9 | C-15 |
|---|---|---|---|---|---|---|---|---|---|---|---|---|---|---|---|---|
| Ethylene-bis-(tetrabromo-phthalimide) | 16.0 | 16.0 | 16.0 | 16.0 | 16.0 | 16.0 | 16.0 | 16 | 10 | 10 | 10 | 10 | 16.0 | 16.0 | 16 | 16 |
| 1,2-dihydro-2,3,4-trimethyl-quinoline | 0.6 | 0.6 | 0.6 | 0.6 | 0.6 | 0.6 | 0.6 | 0.6 | 0.6 | 0.6 | 0.6 | 0.6 | 0.6 | 0.6 | | |
| Vinyl-tris-(2-methoxyethoxy)-silane | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Di-α-cumyl peroxide | 1.4 | 1.4 | 1.4 | 1.4 | 1.4 | 1.4 | 1.2 | 1.2 | 1.0 | 1.0 | 0.8 | 0.8 | 1.4 | 1.4 | 1.2 | 1.2 |
| Calcium carbonate | — | — | 5.0 | 5.0 | 10.0 | 10 | 24.0 | 24.0 | 40.0 | 40.0 | 50.0 | 50.0 | — | — | — | — |
| Magnesium oxide | — | — | — | — | — | — | — | — | — | — | — | — | 10.0 | 10.0 | 24.0 | 24.0 |
| Antimony trioxide | 5.0 | 5.0 | 5.0 | 5.0 | 5.0 | 5.0 | 8.0 | 8.0 | 8.2 | 8.2 | 8.2 | 8.2 | 5.0 | 5.0 | 8.0 | 8.0 |
| Limiting Oxygen Index | 34 | 33 | 33 | 28 | 33 | 26 | 30 | 25 | 32 | 28 | 31 | 28 | 37 | 33 | 34 | 30 |
| Percent by weight smoke evolved | 13.98 | 13.05 | 10.65 | 11.32 | 7.99 | 7.86 | 6.02 | 5.85 | 4.45 | 5.30 | 3.99 | 4.16 | 11.36 | 10.71 | 9.43 | 9.22 |
| Percent by weight decrease in smoke based on Controls C-7 & C-8 | — | — | 23.82 | 13.25 | 42.8 | 39.8 | 56.9 | 55.2 | 68.2 | 59.4 | 71.5 | 65.1 | 18.7 | 17.9 | 32.5 | 29.3 |
| Percent by weight ash | 20.55 | 24.67 | 27.13 | 23.3 | 29.79 | 37.30 | 37.65 | 27.8 | 43.05 | 45.84 | 50.15 | 53.54 | 21.7 | 30.8 | 18.08 | 26.05 |
| Percent by weight halogen (Br) content of ash | — | — | — | — | — | — | — | — | — | — | 8.02 | 5.97 | — | — | — | — |

Similar results are achieved using one or more of other magnesium or calcium compounds in conjunction with antimony oxide in alkylene-alkyl acrylate copolymer compositions as set forth in Tables 4 and 5.

The compositions of Tables 4 and 5 were prepared, formed into plaques and tested for flame retardancy as described previously with respect to compositions of Table 1. Amounts are in parts by weight.

TABLE 4

| | Example 10 | Control 16 | Example 16 | Example 11 |
|---|---|---|---|---|
| Copolymer of ethylene-ethyl acrylate containing ~10 percent by weight combined ethyl acrylate - Melt Index - 2.0 | 39.2 | — | 39.2 | 39.2 |
| Copolymer of ethylene-vinyl acetate containing ~10 percent by weight combined vinyl acetate - Melt Index - 2.0 | — | 39.2 | — | — |
| Talc coated with zinc stearate | 4.9 | 4.9 | 4.9 | — |
| Ethylene-bis-(tetrabromophthalimide) (flame retardant additive) | 14.7 | 14.7 | 14.7 | 9.8 |
| 1,2-dihydro-2,3,4-trimethyl quinoline (antioxidant) | 0.6 | 0.6 | 0.6 | 0.6 |
| Di-α-cumyl peroxide | 1.4 | 1.4 | 1.4 | 1.4 |
| Antimony oxide | 4.9 | 4.9 | 4.9 | 4.9 |
| Calcium carbonate coated with calcium stearate | 34.3 | 34.3 | — | 44.1 |
| Calcium hydroxide | — | — | 34.3 | — |
| Limiting Oxygen Index | 33 | 28 | 32 | 34 |

TABLE 5

| | Example 12 | Control 17 | Example 13 | Example 14 | Example 15 |
|---|---|---|---|---|---|
| Copolymer of ethylene-ethyl acrylate containing ~10 percent by weight combined ethyl acrylate - Melt Index - 2.0 | 49 | — | 48.9 | 39.3 | 39.3 |
| Copolymer of ethylene-vinyl acetate containing ~10 percent by weight combined vinyl acetate - Melt Index - 2.0 | — | 49 | — | — | — |
| Talc coated with zinc stearate | 9.8 | 9.8 | 4.9 | — | — |
| Ethylene-bis-(tetrabromophthalimide) (flame retardant additive) | 14.7 | 14.7 | 14.7 | 9.8 | 9.8 |
| 1,2-dihydro-2,3,4-trimethyl quinoline (antioxidant) | 0.6 | 0.6 | 0.6 | 0.6 | 0.6 |
| Di-α-cumyl peroxide | 1.4 | 1.4 | 1.5 | 1.3 | 1.3 |
| Antimony oxide | 4.9 | 4.9 | 4.9 | 4.9 | 4.9 |
| Magnesium oxide | 19.6 | 19.6 | — | 44.1 | — |
| Magnesium hydroxide | — | — | 24.5 | — | 44.1 |
| Limiting Oxygen Index | 34 | 31 | 37 | 34 | 41 |

What is claimed is:

1. A flame retardant composition comprising an alkylene-alkyl acrylate copolymer, from about one to about 30 percent by weight of a halogenated flame retardant additive, from about 0.5 to about 50 percent by weight of an oxide, carbonate, hydroxide or sulfate of magnesium or calcium and from about 0.5 to about 15 percent by weight of antimony oxide.

2. A flame retardant composition comprising an alkylene-alkyl acrylate copolymer, from about one to about 30 percent by weight of a halogenated flame retardant additive, from about 0.5 to about 30 percent by weight of an oxide, carbonate, hydroxide or sulfate of magnesium or calcium and from about 0.5 to about 15 percent by weight of antimony oxide.

3. A composition as defined in claim 2 wherein the said copolymer is an ethylene-ethyl acrylate copolymer.

4. A composition as defined in claim 2 wherein the magnesium or calcium compound is present in an amount of from about 0.5 to 20 percent by weight.

5. A composition as defined in claim 2 wherein the magnesium or calcium compound is present in an amount more than 20 up to about 30 percent by weight.

6. A composition as defined in claim 2 wherein the antimony oxide is present in an amount of about one to about 10 percent by weight.

7. A composition as defined in claim 2 comprising an alkylene-alkyl acrylate copolymer, from about one to about 30 percent by weight of a halogenated flame retardant additive, from about 0.5 to 20 percent by weight of an oxide, carbonate, hydroxide or sulfate of magnesium or calcium and from about one to about 5 percent by weight of antimony oxide.

8. A composition as defined in claim 2 comprising an alkylene-alkyl acrylate copolymer, from about one to about 30 percent by weight of a halogenated flame retardant additive, more than 20 and up to about 30 percent by weight of an oxide, carbonate, hydroxide or sulfate of magnesium or calcium and from about one to about 10 percent by weight of antimony oxide.

9. A composition as defined in claim 2 comprising an alkylene-alkyl acrylate copolymer, from about 5 to about 20 percent by weight of a halogenated flame retardant additive, from about 2.5 to about 12 percent by weight of an oxide, carbonate, hydroxide or sulfate of magnesium or calcium and from about one to about 10 percent by weight of antimony oxide.

10. A composition as defined in claim 2 wherein the said antimony compound is antimony trioxide.

11. A composition as defined in claim 2 wherein the said carbonate is calcium carbonate.

12. A composition as defined in claim 2 wherein the said oxide is calcium oxide.

13. A composition as defined in claim 2 wherein the said hydroxide is calcium hydroxide.

14. A composition as defined in claim 2 wherein the said sulfate is calcium sulfate.

15. A composition as defined in claim 2 wherein the said carbonate is magnesium carbonate.

16. A composition as defined in claim 2 wherein the said oxide is magnesium oxide.

17. A composition as defined in claim 2 wherein the said hydroxide is magnesium hydroxide.

18. A composition as defined in claim 2 wherein the said sulfate is magnesium sulfate.

19. A composition as defined in claim 2 wherein the oxide, carbonate, hydroxide or sulfate of magnesium or calcium is coated with an organo titanate, organo silane or a metal salt of a fatty acid.

20. A composition as defined in claim 2 which contains a talc filler.

21. A composition as defined in claim 20 wherein talc filler is coated with an organo silane, an organo titanate or a metal salt of a fatty acid.

22. A composition as defined in claim 2 containing an organo silane.

23. A composition as defined in claim 2 containing a peroxide.

24. An electrical conductor insulated with the composition or crosslinked composition defined in claim 7.

25. A wire or cable jacketed with the composition or crosslinked composition defined in claim 8.

26. The crosslinked product of the composition defined in claim 23.

27. The crosslinked product of the composition defined in claim 1.

* * * * *

UNITED STATES PATENT AND TRADEMARK OFFICE
CERTIFICATE OF CORRECTION

PATENT NO. : 4,407,992

DATED : October 4, 1983

INVENTOR(S) : Michael J. Keogh

It is certified that error appears in the above—identified patent and that said Letters Patent is hereby corrected as shown below:

Column 1, line 47; "composition" should read -- compositions --.
Column 3, line 46; "but are not" should read -- but not --.
Column 5, line 21; "parts by weight" should read --percent by weight--.
Column 6, line 60; "parts by weight" should read --percent by weight--.
Column 7, line 28; "parts by weight" should read --percent by weight--.

Signed and Sealed this

Thirty-first Day of January 1984

[SEAL]

Attest:

GERALD J. MOSSINGHOFF

Attesting Officer

Commissioner of Patents and Trademarks